United States Patent
Hahn et al.

(10) Patent No.: US 9,924,545 B2
(45) Date of Patent: Mar. 20, 2018

(54) METHOD FOR PERFORMING RANDOM ACCESS BY TERMINAL, AND TERMINAL

(71) Applicant: LG ELECTRONICS INC., Seoul (KR)

(72) Inventors: Genebeck Hahn, Seoul (KR); Jaehoon Chung, Seoul (KR); Hyeyoung Choi, Seoul (KR); Eunjong Lee, Seoul (KR); Heejeong Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 54 days.

(21) Appl. No.: 14/904,383

(22) PCT Filed: Apr. 9, 2014

(86) PCT No.: PCT/KR2014/003077
§ 371 (c)(1),
(2) Date: Jan. 11, 2016

(87) PCT Pub. No.: WO2015/016455
PCT Pub. Date: Feb. 5, 2015

(65) Prior Publication Data
US 2016/0135227 A1    May 12, 2016

Related U.S. Application Data

(60) Provisional application No. 61/860,925, filed on Aug. 1, 2013, provisional application No. 61/861,437, filed on Aug. 2, 2013.

(51) Int. Cl.
*H04W 24/02* (2009.01)
*H04W 74/08* (2009.01)
*H04W 88/08* (2009.01)

(52) U.S. Cl.
CPC ....... *H04W 74/0833* (2013.01); *H04W 24/02* (2013.01); *H04W 88/085* (2013.01)

(58) Field of Classification Search
CPC ............. H04W 74/0833; H04W 24/02; H04W 88/085
See application file for complete search history.

(56) References Cited

U.S. PATENT DOCUMENTS

2012/0236737 A1* 9/2012 Bergman .......... H04W 74/0833
370/252
2012/0281556 A1    11/2012 Sayana et al.
(Continued)

FOREIGN PATENT DOCUMENTS

KR    10-2012-0022869    3/2012
KR    10-1138175          4/2012

OTHER PUBLICATIONS

PCT International Application No. PCT/KR2014/003077, Written Opinion of the International Searching Authority dated Jul. 18, 2014, 15 pages.

*Primary Examiner* — Andrew Lai
*Assistant Examiner* — Harry H Kim
(74) *Attorney, Agent, or Firm* — Lee Hong Degerman Kang Waimey

(57) ABSTRACT

Disclosed are: a terminal for selecting RRUs of which a connection state with the terminal is a critical value or more from among a plurality of RRUs on the basis of down signals received from the RRUs, transmitting an RRU list including information on the selected RRUs and a random access preamble to an RRU having the best connection state with the terminal among the selected RRUs, receiving an access information response message indicating a preferred RRU with which a random access is to be performed by the terminal from any one RRU among the selected RRUs and
(Continued)

performing a random access process with the preferred RRU; and a method for performing random access by the terminal.

12 Claims, 9 Drawing Sheets

(56) References Cited

U.S. PATENT DOCUMENTS

| | | |
|---|---|---|
| 2013/0070722 A1 | 3/2013 | Li et al. |
| 2013/0190002 A1 | 7/2013 | De Pasquale et al. |
| 2014/0212129 A1* | 7/2014 | Huang ................ H04W 48/20 |
| | | 398/2 |
| 2014/0219185 A1* | 8/2014 | Etemad ................ H04W 52/34 |
| | | 370/329 |
| 2015/0237571 A1* | 8/2015 | Laraqui ................ H04W 48/20 |
| | | 370/332 |

* cited by examiner

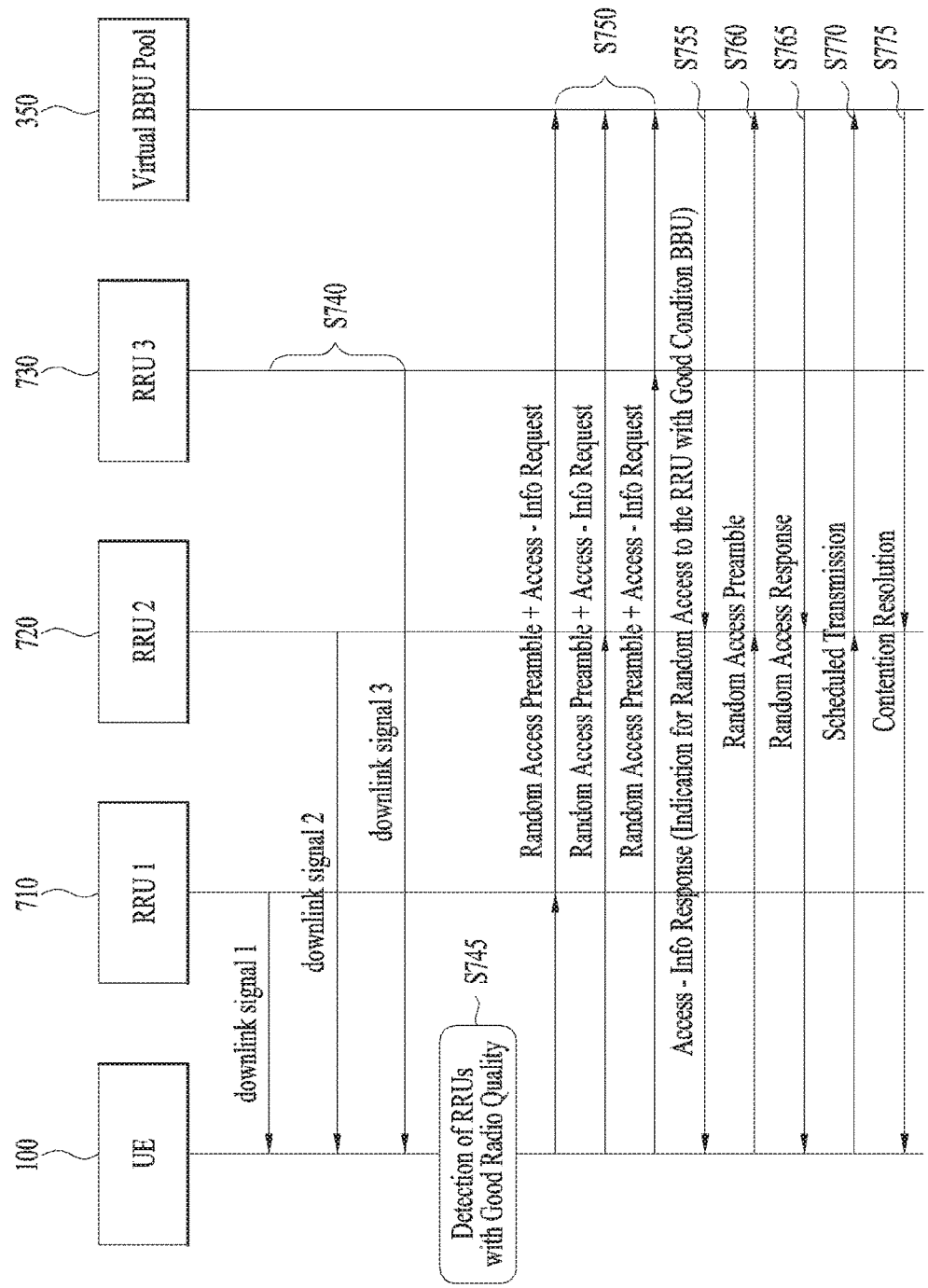

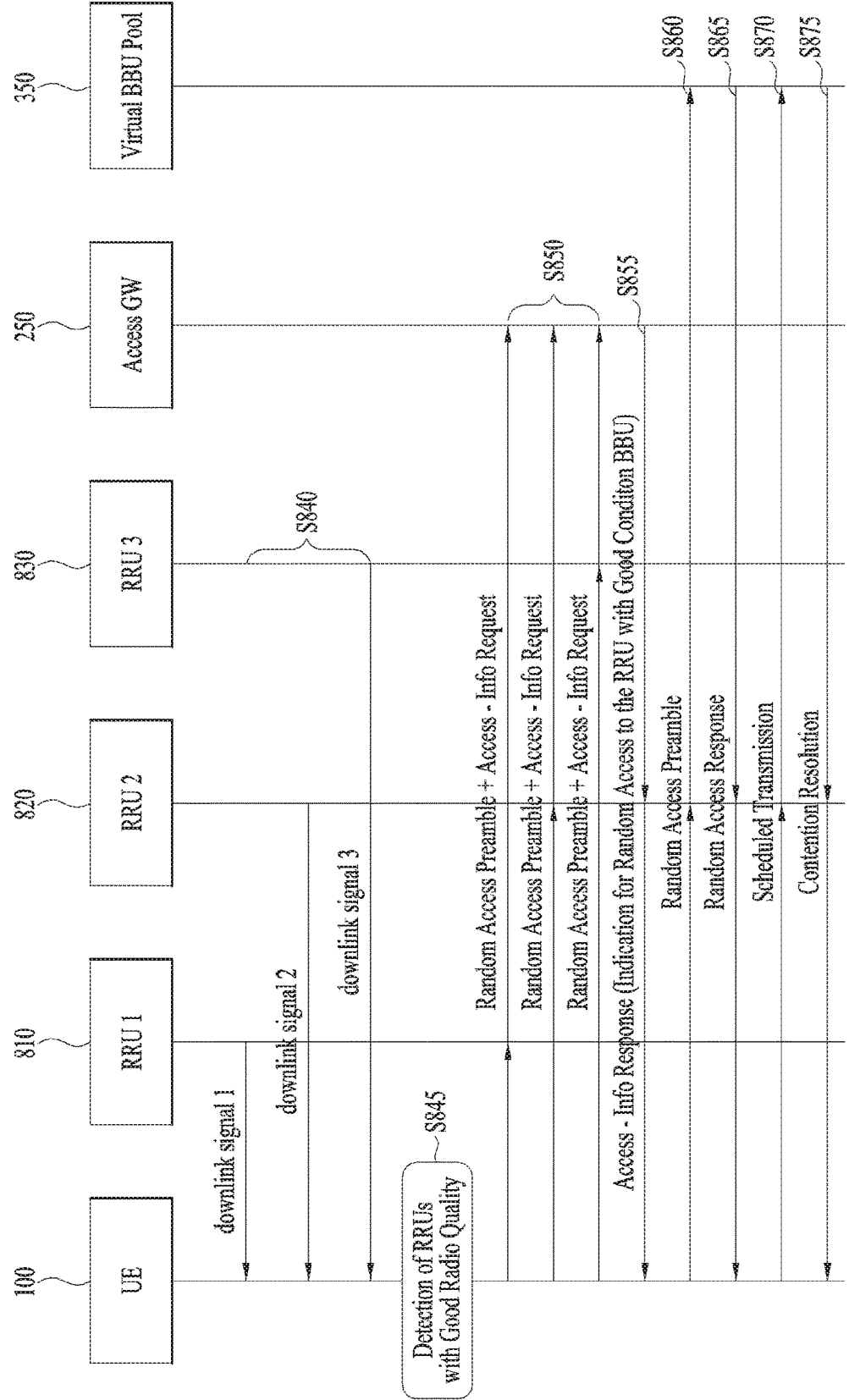

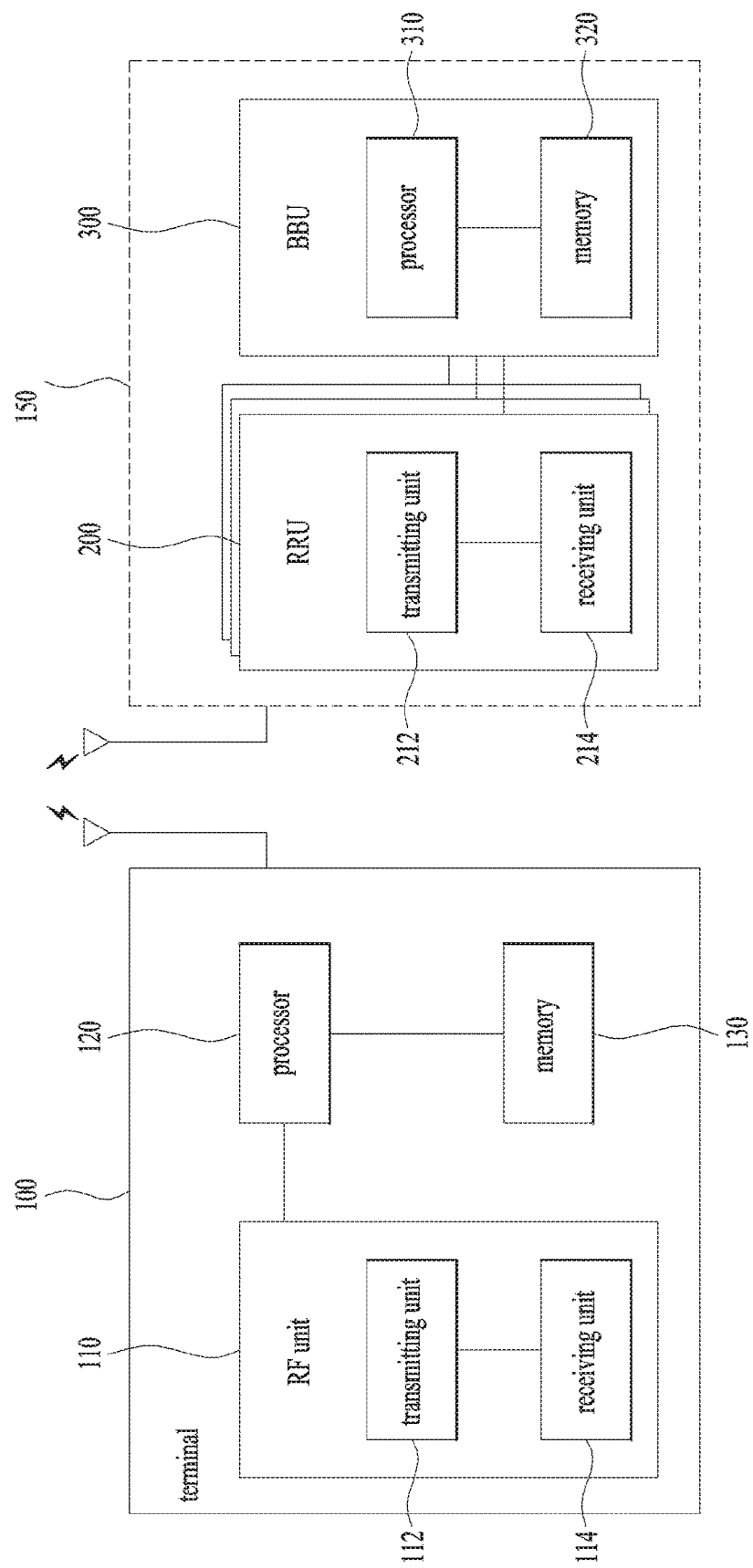

METHOD FOR PERFORMING RANDOM ACCESS BY TERMINAL, AND TERMINAL

CROSS-REFERENCE TO RELATED APPLICATIONS

This application is the National Stage filing under 35 U.S.C. 371 of International Application No. PCT/KR 2014/003077, filed on Apr. 9, 2014, which claims the benefit of U.S. Provisional Application Nos. 61/860,925, filed on Aug. 1, 2013, and 61/861,437, filed on Aug. 2, 2013, the contents of which are all hereby incorporated by reference herein in their entirety.

TECHNICAL FIELD

The present invention relates to a method of performing random access in cloud RAN environment in which an RRU and a BBU are separated from each other and a terminal therefor.

BACKGROUND ART

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network. An object of a new radio access network configuration is to increase QoE (Quality of Experience) in a manner of providing a high data transfer rate to a final user.

In small cell enhancements for E-UTRA and E-UTRAN study item (SI) as one of $3^{rd}$ generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conduced to draw advantages of concept of dual connectivity to small cell layers and a macro cell layer in which a user uses the same or different carriers.

When the aforementioned trend is considered, users are more physically close to a network according to deployment of various small cells. Hence, it is expected that future communication is going to be performed via a user-centered virtual zone instead of a legacy cell of a base station in an enhanced 5G wireless access network. Moreover, in order to enable the communication via the user-centered virtual zone to be performed, it is necessary to induce a service providing unit differentiated from a legacy cell-based service providing unit. In particular, it is necessary to induce and solve technical issues capable of implementing such a service providing unit as a user-centered zone and the service providing unit may lead to a huge change of a current wireless access network.

DISCLOSURE OF THE INVENTION

Technical Tasks

The present invention is directed to an apparatus for and method thereof that substantially obviate one or more of the problems due to limitations and disadvantages of the related art. An object of the present invention is to enable a terminal to efficiently perform random access in user-centered network environment.

Another object of the present invention is to enable a terminal to perform random access via an RRU and a BBU providing optimized connectivity in network environment in which the RRU and the BBU are separated from each other.

The other object of the present invention is to enable a terminal to stably perform random access in a situation that a mapping relationship between an RRU and a BBU is changing.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

The aforementioned technical tasks can be solved by a method of performing a random access, which is performed by a terminal in cloud RAN environment in which an RRU and a BBU are separated from each other, and the terminal, thereby enhancing communication environment.

Advantageous Effects

Accordingly, the present invention provides the following effects or advantages.

First of all, a terminal can efficiently perform random access in user-centered network environment.

Secondly, a terminal can determine an optimized pair of an RRU and a BBU to perform random access in environment in which an RRU and a BBU are separated from each other.

Thirdly, a terminal can stably perform communication since the terminal performs random access in a manner of reflecting a change of a mapping relationship between an RRU and a BBU.

Additional advantages, objects, and characteristics of the present invention can be clearly understood in a manner that those skilled in the art implement the present invention based on the following description. Moreover, the present invention may have an unexpected advantage while those skilled in the art implement the present invention based on the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a flowchart for explaining a method of performing random access according to a further different embodiment of the present invention;

FIG. 8 is a flowchart for explaining a method of performing random access according to a further different embodiment of the present invention;

FIG. 9 is a block diagram for a configuration of a terminal, an RRU and a BBU according to one embodiment of the present invention.

BEST MODE

Figure 1:
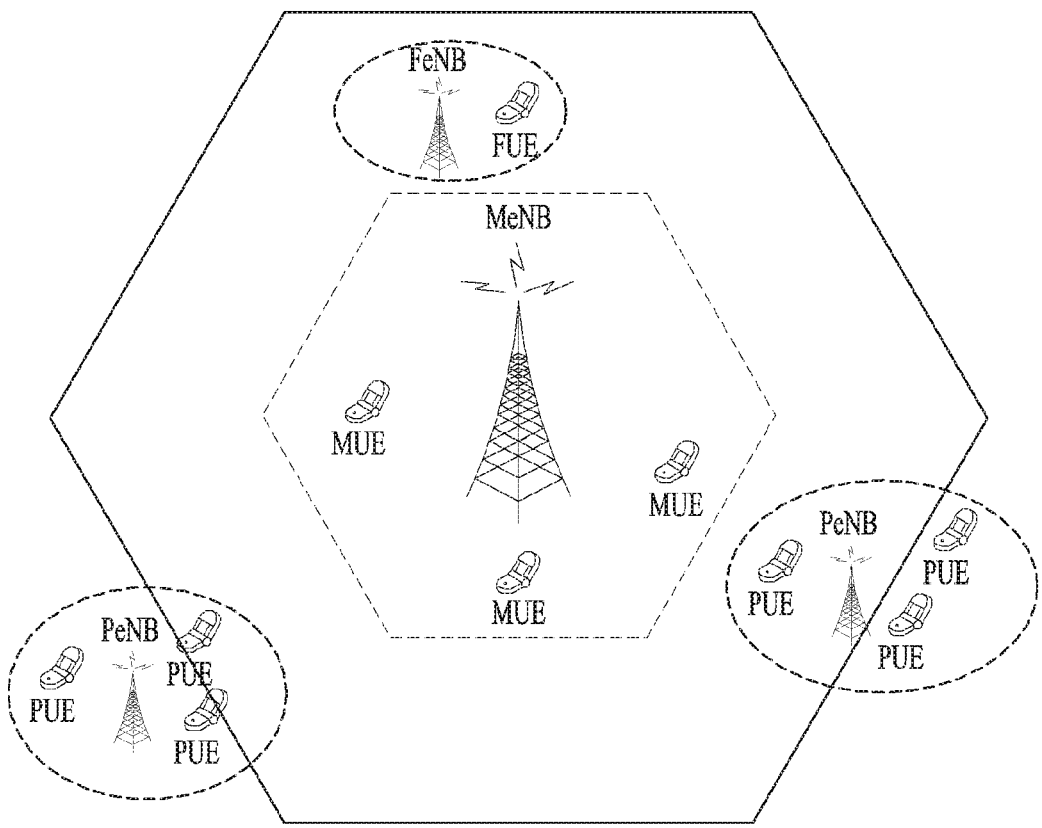
FIG. 1 is a diagram for heterogeneous network environment according to one embodiment of the present invention.

To achieve these and other advantages and in accordance with the purpose of the present invention, as embodied and broadly described, according to one embodiment, a method of performing a random access, which is performed by a terminal in C-RAN (cloud radio access network) environment in which an RRU (remote radio unit) and a BBU (baseband unit) are separated from each other, includes the steps of selecting RRUs of which a connection state with the terminal is equal to or greater than a threshold from among a plurality of RRUs based on downlink signals received from a plurality of the RRUs, transmitting an RRU list including information on the selected RRUs and a random access preamble to an RRU of which the connection state with the terminal is best among the selected RRUs, receiving an access information response message indicating a preferred RRU in which the random access is to be performed by the terminal from a prescribed RRU among the selected RRUs, and performing a random access process with the preferred RRU. In this case, the preferred RRU may be an RRU connected with a preferred BBU supporting the random access process of the terminal.

The random access response message can be received from the preferred RRU.

When the random access response message is received from a different RRU instead of the preferred RRRU, the random access response message can further include identification information on the preferred RRU.

The random access response message can be received from the RRU of which the connection state with the terminal is best.

The preferred BBU is selected from a BBU pool including a plurality of BBUs connected with a plurality of the RRUs and the access information response message can be delivered to the prescribed RRU from the preferred BBU.

The preferred BBU can be determined in consideration of at least one of an available resource status and a load status of the BBUs included in the BBU pool.

The preferred BBU can be selected by a BBU connected with the RRU which has received the RRU list and the random access preamble.

The RRU list can be transmitted to the RRU of which the connection state is best on a channel differentiated from a channel for transmitting the random access preamble.

A plurality of the RRUs can be connected with a BBU pool including a plurality of BBUs via an access gateway.

The transmitting comprises transmitting the RRU list and the random access preamble to all of the selected RRUs in addition to the RRU of which the connection state is best.

The access information response message can be received from the preferred RRU connected with the preferred BBU.

To further achieve these and other advantages and in accordance with the purpose of the present invention, according to a different embodiment, a terminal performing a random access in C-RAN (cloud radio access network) environment in which an RRU (remote radio unit) and a BBU (baseband unit) are separated from each other includes a transmitting unit, a receiving unit, and a processor configured to support the random access to be performed in a manner of being connected with the transmitting unit and the receiving unit, the processor configured to select RRUs of which a connection state with the terminal is equal to or greater than a threshold from among a plurality of RRUs based on downlink signals received from a plurality of the RRUs, the processor configured to transmit an RRU list including information on the selected RRUs and a random access preamble to an RRU of which the connection state with the terminal is best among the selected RRUs, the processor configured to receive an access information response message indicating a preferred RRU in which the random access is to be performed by the terminal from a prescribed RRU among the selected RRUs, the processor configured to perform a random access process with the preferred RRU. In this case, the preferred RRU may be an RRU connected with a preferred BBU supporting the random access process of the terminal.

It is to be understood that both the foregoing general description and the following detailed description are exemplary and explanatory and are intended to provide further explanation of the invention as claimed.

MODE FOR INVENTION

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a', 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS)', 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Deployment

FIG. 1 illustrates a heterogeneous network wireless deployment according to the present invention.

To guarantee a more stable data service such as multimedia service in future-generation mobile communication, much attention has been attracted to a hierarchical cell structure or heterogeneous cell structure in which micro cells (pico cells or femto cells) are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each serve corresponding UEs by resource allocation based on cell coordination. As one of core technologies for implementing the heterogeneous network environment, it is able to use a method of implementing an RRU (remote radio unit) and a BBU (baseband unit) in a manner of separating the RRU from the BBU.

2. Cloud RAN Environment in which RRU and BBU are Separated from Each Other.

Figure 2:
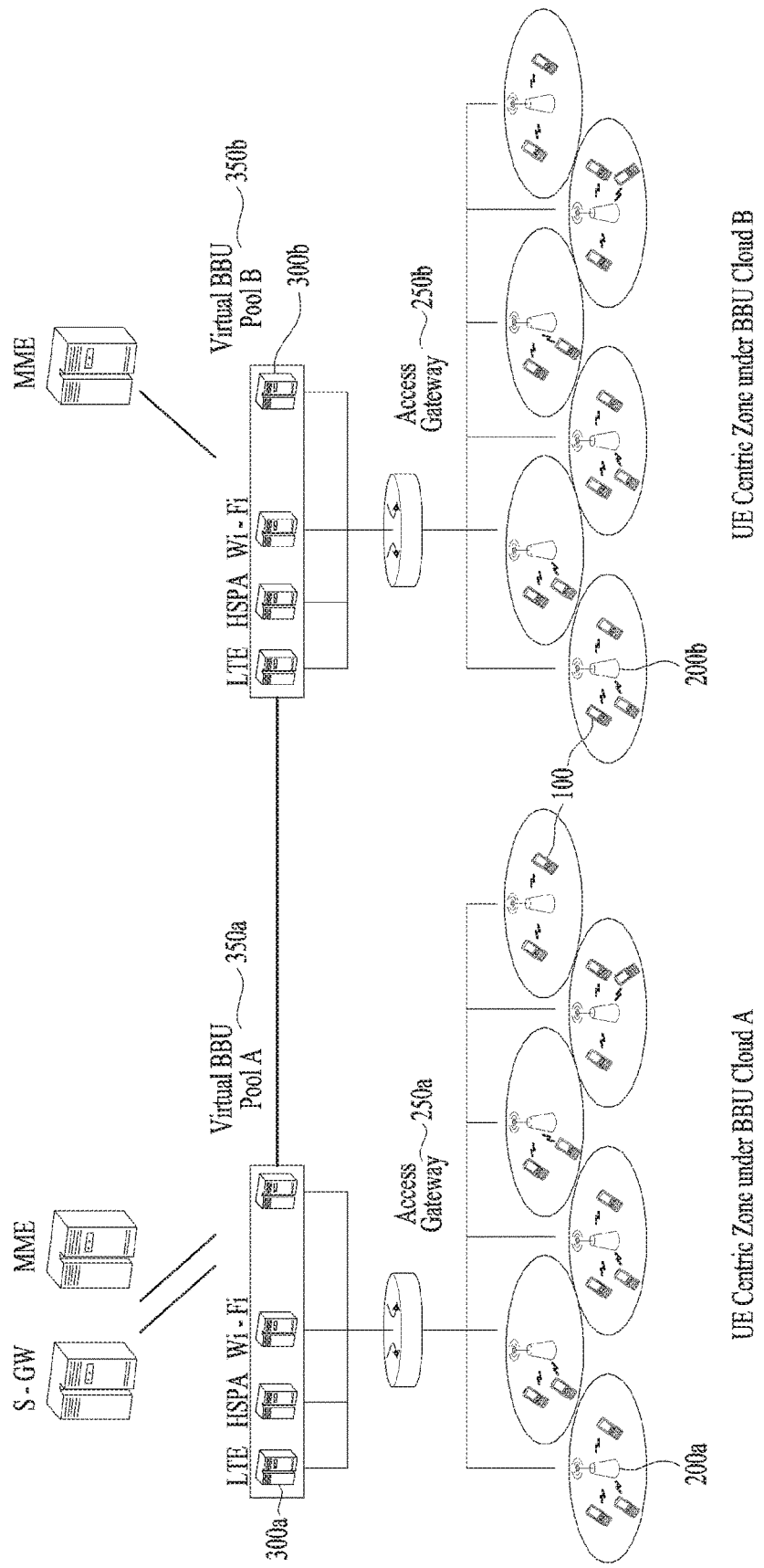
FIG. 2 is a diagram for cloud RAN environment according to one embodiment of the present invention.

FIG. 2 is a diagram for cloud RAN environment according to one embodiment of the present invention. The cloud RAN environment can include a plurality of RRUs *200a/200b*, a software-based virtual BBU pool *350a/350b* or a virtual base station (VBS) and an access control/resource management/authentication server controlling a plurality of the RRUs and the software-based virtual BBU pool or the VBS. As elements of a core network are changing to an open IP network in cloud RAN environment, various elements of the cloud RAN are directly interworking the elements of the core network in an organic relation.

Meanwhile, as mentioned in the foregoing description, an RRU *200a/200b* and a BBU *300a/300b* can be implemented in a manner of being separated from each other as an example of the cloud RAN environment. When the RRU and the BBU are separated from each other, it may be able to construct cloud RAN environment including characteristics described in the following.

First of all, there exists a virtual BBU pool *350a/350b* and the virtual BBU pool includes a plurality of BBUs *300a/300b*. The virtual BBU pool *350a/350b* has a structure associated with SAS (shared antenna system) RRUs *200a/200b* supporting Multi-RAT (multi radio access technology) via an access gateway *250a/250b*. The virtual BBU pool *350a/350b* includes a plurality of BBUs *300a/300b* supporting various wireless access technologies and a single RRU *200a/200b* can be associated with one or more BBUs *300a/300b*. On the contrary, a single BBU *300a/300b* can be associated with one or more RRUs *200a/200b*. The BBUs *300a/300b* included in the virtual BBU pool *350a/350b* can be connected with the RRUs *200a/200b* via ideal/non-ideal backhaul and a single virtual BBU pool *350a* can be connected with a different virtual BBU pool *350b* via X2 interface or interface similar to the X2 interface.

Secondly, all RRUs *200a/200b* included in the virtual BBU pool *350a/350b* have an identical virtual cell ID. And, all BBUs *300a/300b* and all RRUs *200a/200b* included in the virtual BBU pool *350a/350b* are connected with each other via ideal backhaul and an RRU *200a/200b* is controlled by a BBU *300a/300b* associated with the RRU.

Thirdly, a sync signal, which is used for obtaining a downlink sync, is transmitted by each of the RRUs *200a/200b* and the sync signal is transmitted in a manner of including not only a virtual cell ID representing the virtual BBU pool *350a/350b* to which the RRUs *200a/200b* belong thereto but also an RRU ID capable of identifying each of the RRUs *200a/200b*.

Fourthly, each of the RRUs *200a/200b* assumes a simple antenna and L1/L2/L3 layer processing is performed by the BBUs *300a/300b* existing in the virtual BBU pool *350a/350b*. The RRUs *200a/200b* have an attribute of an SAS and it indicates that the RRU *200a/200b* belonging to a BBU of the virtual BBU pool *350a/350b* may belong to another BBU instead of the BBU. In particular, a time variable belonging of the RRU *200a/200b* may change from a BBU to another BBU according to a situation of the BBU 300*a*/ 300*b* (e.g., load of the BBU, available resource situation, etc.).

According to a related art, there exists a physical cell and users access the cell to receive a service. Yet, as mentioned in the foregoing description, if an RRU and a BBU are implemented in a manner of being separated from each other, a network constructs a zone capable of providing optimized communication environment in a user unit and can provide a service to users based on the zone.

In the following, a method for a terminal 100 to perform random access in environment in which an RRU and a BBU are separated from each other is explained.

3. Method of Performing Random Access

Figure 3:
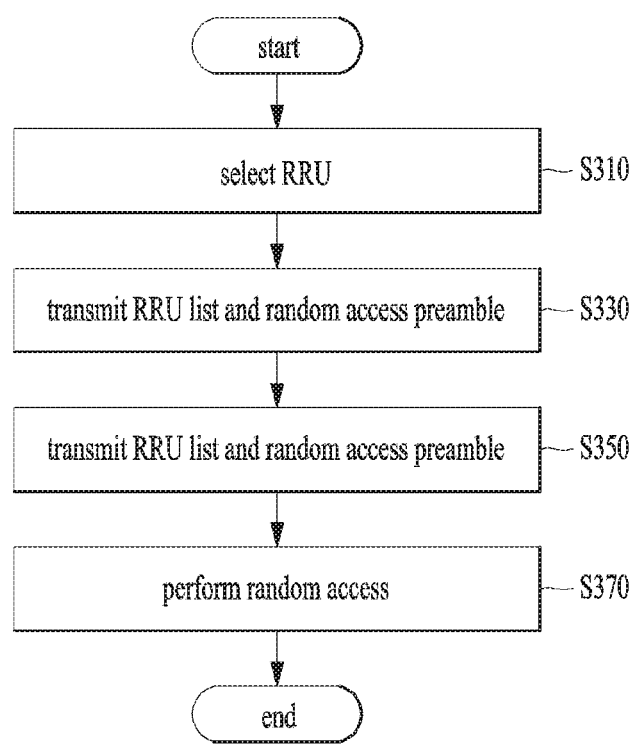
FIG. 3 is a flowchart for explaining a method of performing random access according to one embodiment of the present invention.

FIG. 3 is a flowchart for explaining a method of performing random access according to one embodiment of the present invention.

First of all, a terminal selects an RRU of which a connection state or radio quality with the terminal is equal to or greater than a specific level from among a plurality of connected RRUs [S310]. For example, the terminal can identifies a connection state of each of a plurality of the RRUs based on downlink signals received from each of a plurality of the RRUs. The terminal digitizes a measured connection state, signal quality and radio quality and may be able to compare them with a predetermined threshold. Subsequently, the terminal can select one or more RRUs of which a measured connection state or radio quality is equal to or greater than the threshold from among a plurality of the RRUs.

Meanwhile, the terminal can utilize strength of a downlink signal received from an RRU as a reference for measuring a connection state or radio quality of the RRU. The selected RRUs of which the connection state is equal to or greater than the threshold may refer to as an associated RRU set. The associated RRU set may correspond to RRUs periodically or consistently monitored and detected by the terminal according to a system request or a situation.

Subsequently, the terminal transmits information on the RRU selected in the step S310 and a random access preamble to an RRU [S330]. The information on the RRU can include an RRU list of the RRUs selected in the step S310. And, the terminal can transmit the RRU list and a random access preamble to an RRU of which a connection state or radio quality is best among a plurality of the RRUs. Meanwhile, the information on the RRU included in the RRU list may correspond to a prescribed reference signal for identifying an RRU. For example, the prescribed reference signal can be implemented by an RRU specific reference signal (RRS) of a form similar to a form of a cell specific reference signal (CRS).

Meanwhile, in the step S330, each of the RRU list and the random access preamble can be transmitted to an RRU through a separate channel. In particular, the terminal can transmit the RRU list using a channel different from a channel on which the random access preamble is transmitted. And, the RRU list or the random access preamble can be transmitted not only using a PRACH (physical random access channel) utilized in a legacy communication system but also using a time-frequency resource newly defined in cloud RAN environment.

If the RRU list and the random access preamble are transmitted to an RRU in the step S330, the RRU transmits the RRU list and the random access preamble to a BBU connected with the RRU. Having received the RRU list and the random access preamble, the BBU selects a BBU (hereinafter, a preferred BBU) to perform a random access process of the terminal in consideration of a situation of BBUs included in a virtual BBU pool. The BBU, which has received the random access preamble and the RRU list, may become the preferred BBU or a different BBU included in the virtual BBU pool may become the preferred BBU.

Subsequently, having received the random access preamble, the BBU transmits an access information response message to the terminal via a specific RRU to make the terminal perform a random access process via an RRU (hereinafter, a preferred RRU) connected with the preferred BBU. The BBU transmitting the response message can transmit the access information response message to at least one selected from the group consisting of an RRU of which a connection state with the terminal is best at the time of transmitting the response message, the RRU, which has received the RRU list and the random access preamble from the terminal in the step S330, and the preferred RRU connected with the preferred BBU.

In particular, the terminal receives the access information response message, which is delivered via the specific RRU, from the BBU [S350]. For example, the terminal can receive the access information response message via an RRU among the RRUs selected in the step S310. Specifically, the terminal can receive the access information response message from one selected from the group consisting of the RRU of which the connection state with the terminal is best at the time of transmitting the response message, the RRU, which has received the RRU list and the random access preamble from the terminal in the step S330, and the preferred RRU connected with the preferred BBU.

As mentioned in the foregoing description, the access information response message includes a command for making the terminal perform random access via the preferred RRU. And, the access information response message can include detail information on the preferred RRU. For example the access information response message can include an RRU ID of the preferred RRU.

Meanwhile, the access information response message can be directly transmitted to the terminal via the preferred RRU from the preferred BBU instead of the BBU, which has received the random access preamble. In this case, detail identification information on the preferred RRU can be omitted from the access information response message. In particular, since the response message is delivered from the preferred RRU corresponding to a target of performing random access, it is not necessary for the terminal to additionally identify the preferred RRU using an RRU ID. The preferred RRU may correspond to an RRU identical to the RRU to which various information are transmitted by the terminal in the step S330 (i.e., the RRU of which connection state with the terminal or radio quality is best in the step S330) or a different RRU.

Subsequently, the terminal performs random access on the preferred RRU according to the indication of the access information response message [S370]. In particular, the terminal transmits a random access preamble to the preferred RRU, which is identified using the RRU ID included in the access information response message, receives a random access response via the preferred RRU, transmits data in accordance with uplink sync and enters into an RRC connection state with the preferred BBU and the preferred RRU in a manner of passing through a contention resolution procedure. A random access process performed via the preferred RRU can be supported by the preferred BBU connected with the preferred RRU.

In the foregoing description, although it is described as the BBU, which has received the random access preamble and the RRU list, determines the preferred BBU and transmits the access information response message, the BBU itself, which has received the information from the terminal, can also be determined as the preferred BBU. According to the present embodiment, since the preferred BBU has already received the random access preamble together with the RRU list, the preferred BBU can immediately transmit the random access response without transmitting the access information response message to the terminal via the preferred RRU. In particular, if the BBU, which has received the random access preamble, is determined as the preferred BBU, the step S350 is omitted and a random access process can be immediately performed according to the step S370.

Figure 4:
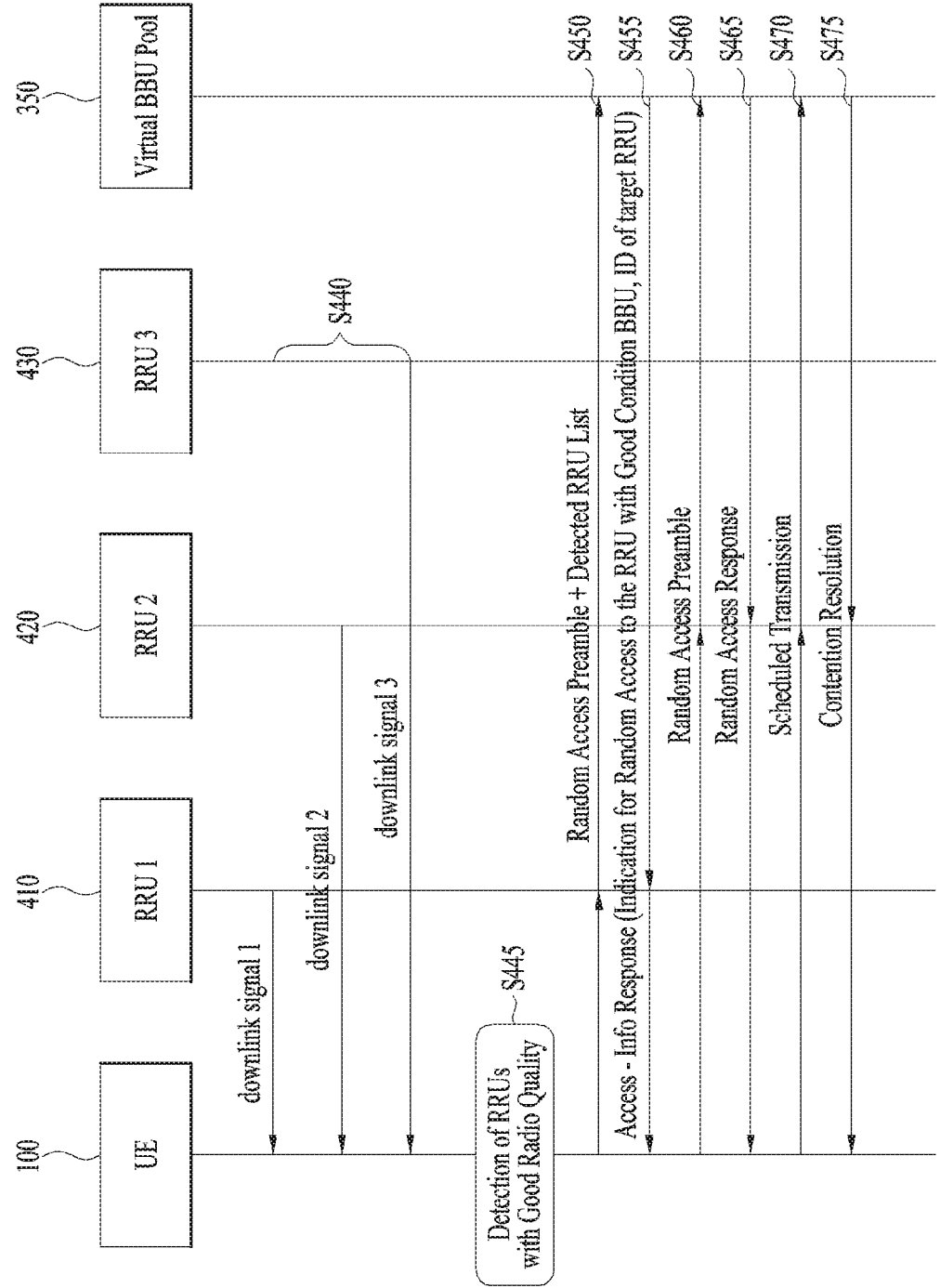
FIG. 4 is a flowchart for explaining a method of performing random access according to a different embodiment of the present invention.

FIG. 4 is a flowchart for explaining a method of performing random access according to a different embodiment of the present invention. In an embodiment shown in FIG. 4, a terminal 100 is connected with 3 RRUs 410/420/430 and a virtual BBU pool 350 includes BBUs connected with the RRUs 410/420/430.

First of all, the terminal 100 receives a downlink signal from each of the RRU 1 401, the RRU 2 420 and the RRU 3 430 [S440]. The terminal 100 can measure a connection state between each RRU and the terminal and signal quality by measuring strength of the received downlink signal and select an RRU of which signal quality or a connection state is equal to or greater than a threshold from among the 3 RRUs [S445]. In the present embodiment, the terminal 100 measures the best connection state from the RRU 1 410 and measures radio signal quality and a connection state less than the threshold from the RRU 3 430.

Subsequently, the terminal 100 transmits an RRU list including information on the RRU 1 410 and the RRU 2 420 of which a connection state/radio quality is equal to or greater than the threshold and a random access preamble to a virtual BBU pool 350 via the RRU 1 410 [S450]. In particular, the terminal 100 can transmit the random access preamble and the RRU list to the RRU 1 410 corresponding to an RRU including the best connection state.

Subsequently, the RRU 1 410 transmits the information received from the terminal 100 to a BBU (e.g., a BBU 1) included in the virtual BBU pool 350 and connected with the RRU 1 410. Having received the information from the RRU 1 410, the BBU 1 can select a BBU (a preferred BBU) most appropriate for supporting the terminal 100 from among the BBUs included in the virtual BBU pool 350 in consideration of an available resource status of each of the BBUs, a load status and the like. Basically, the BBUs included in the virtual BBU pool 350 can collect and obtain information on time variable load state and available resource status of other BBUs and may be able to share the information with an access gateway configured to connect the RRUs and the BBUs with each other.

Meanwhile, the preferred BBU may correspond to the BBU 1, which has received the information from the RRU 1 410 or a different BBU belonging to the virtual BBU pool 350. In the present embodiment, a BBU 2 (a BBU connected with an RRU 2) different from the BBU 1 is selected as the preferred BBU.

Subsequently, having received the random access preamble and the RRU list from the terminal 100, the BBU 1 transmits an access information response message to the terminal 100 via the RRU 1 410 [S455]. In particular, the access information response message can be transmitted to the terminal 100 via the RRU 1 410, which has delivered the RRU list and the random access preamble to the virtual BBU pool in the step S450, since it is determined as the RRU 1 includes the best connection state with the terminal 100. As mentioned in the foregoing description, the access information response message can include identification information (e.g., an RRU ID of an RRU 2) on a preferred RRU (RRU 2) connected with a preferred BBU (a BBU 2) and a command for indicating random access to be performed via the RRU 2.

If a plurality of RRUs (e.g., RRU 2 and RRU 4) are connected with a preferred BBU, the preferred BBU can select an RRU (RRU 2), which is included in the RRU list reported from the terminal 100, from among a plurality of the RRUs as a preferred RRU. Moreover, if a plurality of RRUs are included in the list, a random RRU among a plurality of the RRUs or an RRU of which a connection state with the terminal 100 is best can be selected as a preferred RRU. In particular, the preferred BBU can select a preferred RRU from among a plurality of RRUs connected with the preferred BBU in consideration of a connection state with the terminal or radio signal quality.

Meanwhile, unlike the example shown in the drawing, the access information response message can be directly transmitted to the terminal 100 via the BBU 2 (i.e., preferred BBU) instead of the BBU 1. In this case, the BBU 2 corresponding to the preferred BBU transmits the access information response message to the terminal 100 via the RRU 2 420 corresponding to the preferred RRU connected with the BBU 2. Since the access information response message is directly transmitted to the terminal 100 from the RRU 2 420, identification information on the RRU 2 420 can be omitted from the access information response message.

The terminal 100 performs random access with the RRU 2 420 corresponding to the preferred RRU according to the received access information response message. In particular, the terminal 100 transmits a random access preamble to the RRU 2 420 [S460], receives a random access response from the BBU 2 via the RRU 2 420 [S465], transmits a synchronized uplink signal [S470] and forms an RRC connection state with the RRU 2 and the BBU 2 in a manner of passing through a contention resolution procedure [S475].

Meanwhile, unlike what is mentioned in the foregoing description, if the BBU 1 itself, which has received the random access preamble and the RRU list from the terminal 100, is determined as a preferred BBU, the step S455 and the step S460 can be omitted. In particular, since the BBU 1 has already received the random access preamble from the terminal 100, the BBU 1 can transmit a random access response to the terminal 100 via the RRU 1 410 in response to the random access preamble [S465]. Subsequently, the terminal 100 can perform a random access process via the step S470 and the step S475.

Figure 5:
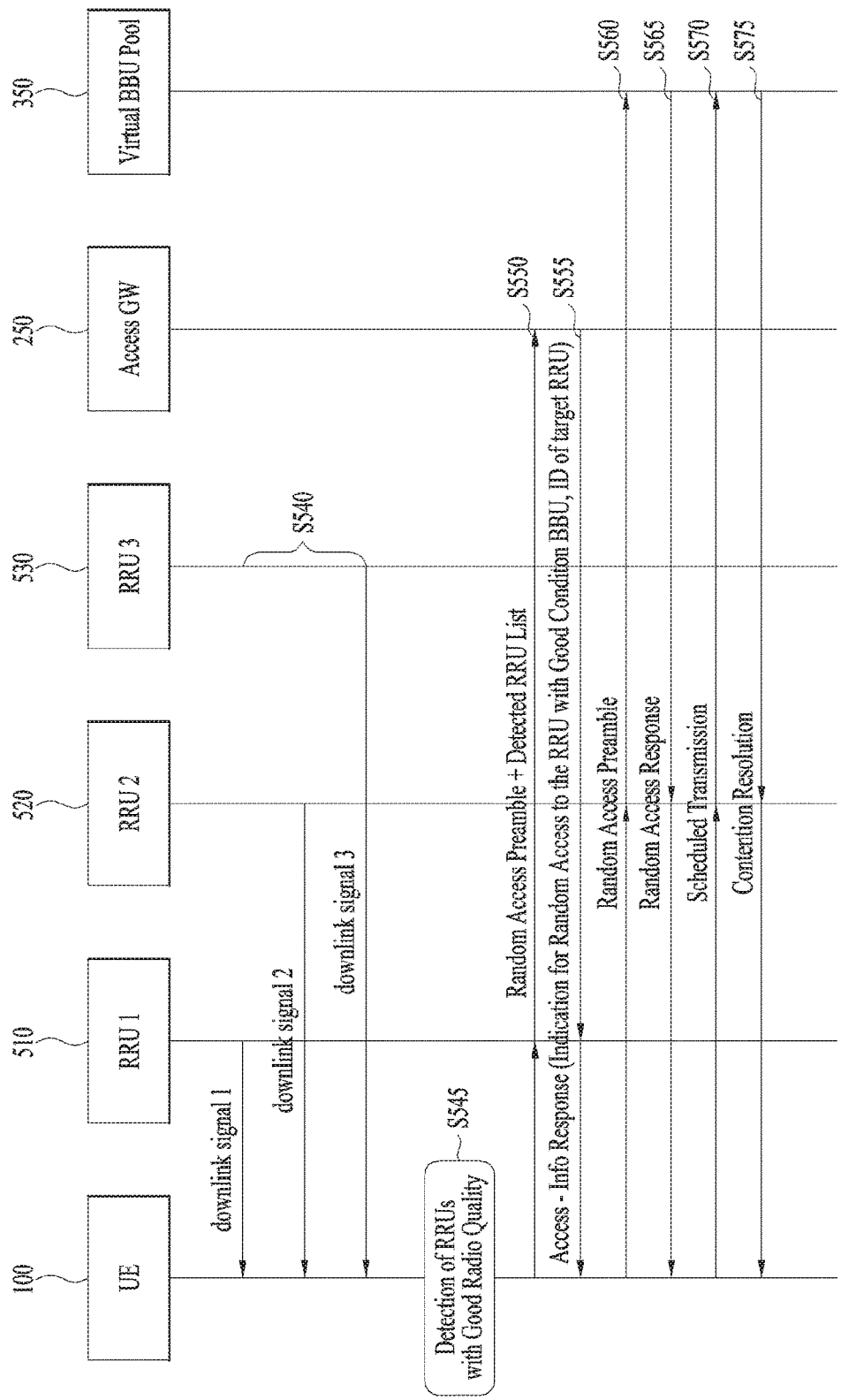
FIG. 5 is a flowchart for explaining a method of performing random access according to a further different embodiment of the present invention.

FIG. 5 is a flowchart for explaining a method of performing random access according to a further different embodiment of the present invention. FIG. 3 shows an access gateway 250 connecting 3 RRUs 510/520/530 with a virtual BBU pool 350. In FIG. 5, detail explanation on a part duplicated with FIG. 4 is omitted.

In FIG. 4, a BBU receiving information from a terminal 100 selects a preferred BBU from among BBUs included in the virtual BBU pool 350. On the contrary, a preferred BBU can be determined by an access gateway 250 instead of a BBU in FIG. 5. In particular, since the access gateway 250 is able to know a load status, a resource situation and the like of BBUs connected with RRUs, a process of selecting a preferred BBU can be performed by the access gateway 250 without involvement of the virtual BBU pool 350.

Specifically, the access gateway 250 receives a random access preamble and an RRU list from an RRU 1 510 [S550]. Subsequently, the access gateway 250 selects a preferred BBU most appropriate for supporting the terminal 100 from among BBUs included in the virtual BBU pool 350 and delivers an access information response message to the terminal 100 via an RRU [S555]. As mentioned earlier in FIG. 4, the access information response message can be transmitted by the RRU 1 510, which has transmitted the random access preamble to the access gateway 250. Or, the access information response message can be directly transmitted to the terminal 100 by an RRU 2 520 connected with a BBU 2 corresponding to the preferred BBU.

Having received the access information response message, the terminal 100 performs a random access procedure with the preferred BBU via the RRU 2 520 corresponding to a preferred RRU according to an indication of the access information response message [S560, S565, S570, S575].

Figure 6:
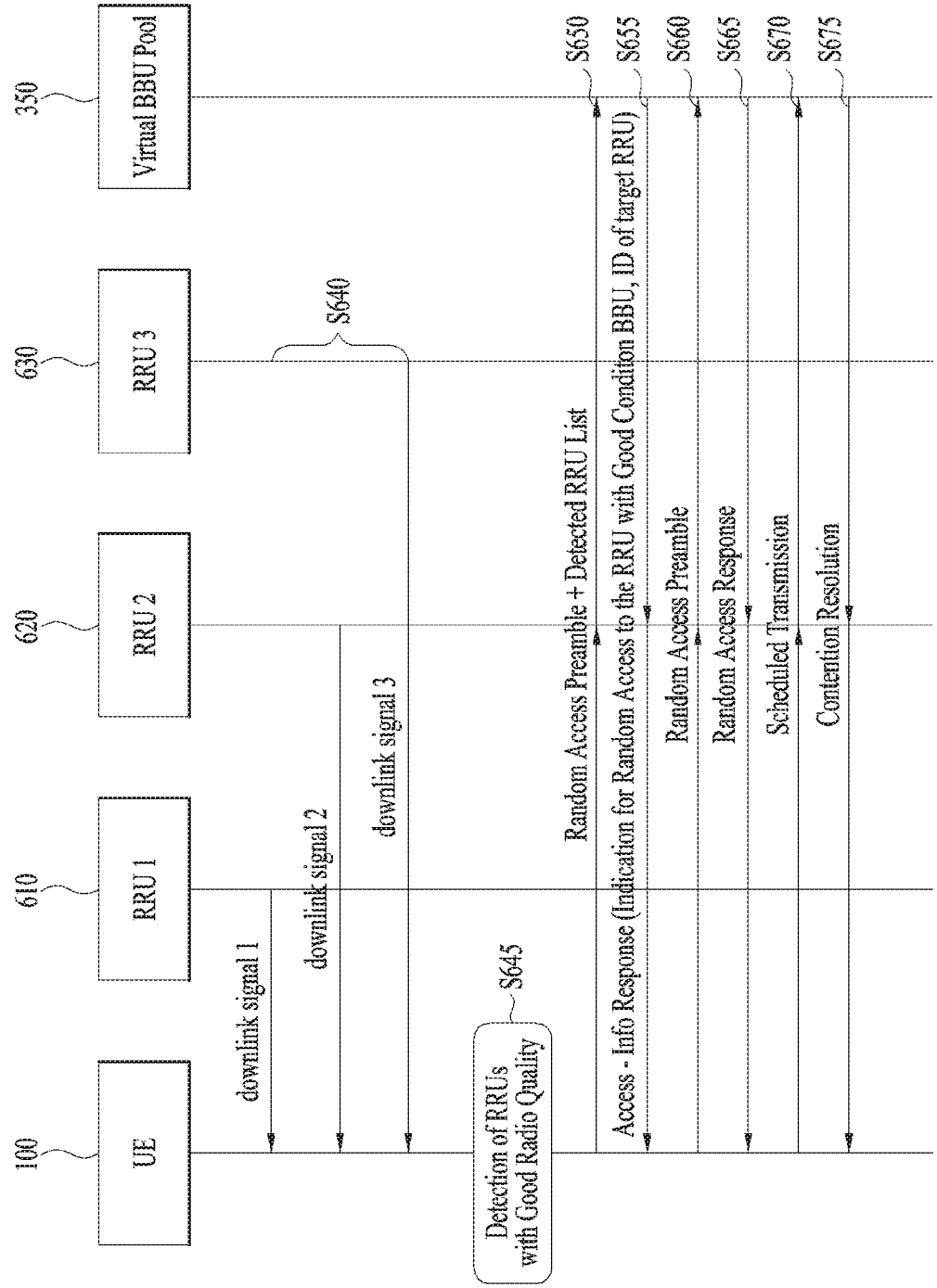
FIG. 6 is a flowchart for explaining a method of performing random access according to a further different embodiment of the present invention.

FIG. 6 is a flowchart for explaining a method of performing random access according to a further different embodiment of the present invention. In an embodiment shown in FIG. 6, a terminal 100 is connected with an RRU 2 620 prior to the step S640 and performs communication with a BBU 2.

Subsequently, if a situation of performing a new random access occurs, the terminal 100 identifies connection states of RRUs and radio quality based on downlink signals received from 3 RRUs 610/620/630 [S640, S645]. In the present embodiment, the terminal 100 identifies that all of the connection states of 3 RRUs 610/620/630 are equal to or greater than a threshold and identifies that a connection state of an RRU 1 610 is best.

The terminal 100 transmits a random access preamble and an RRU list to the RRU 2 620 with which communication is performed in a manner of being previously connected [S650]. In particular, although a connection state with a newly detected RRU 1 610 is best, the terminal 100 can transmit an RRU list (information on the RRU 1, the RRU 2 and the RRU 3) and a random access preamble through the previously connected RRU 2 620.

Subsequently, having received the random access preamble and the RRU list from the terminal 100, the RRU 2 620 transmits the information to the BBU 2 and the BBU 2 selects a preferred BBU most appropriate for supporting a random access of the terminal 100 from the BBU pool 350. For example, if the BBU 2 itself is determined as a most appropriate preferred BBU, the BBU 2 transmits an access information response message to the terminal 100 via the RRU 2 620 corresponding to a preferred RRU [S655]. If a different BBU instead of the BBU 2 is determined as a preferred BBU, the BBU 2 can make the preferred BBU transmit the access information response message to the terminal 100 via a preferred RRU.

Subsequently, the terminal 100 performs a random access process via the RRU 2 620 corresponding to the preferred RRU according to the received access information response message [S660, S665, S670, S675]. Contents related to the access information response message and the random access process can be performed in a manner of being similar to the embodiments mentioned earlier in FIG. 4 and FIG. 5 and the aforementioned content can be applied.

FIG. 7 is a flowchart for explaining a method of performing random access according to a further different embodiment of the present invention.

A terminal 100 selects an RRU having a connection state and radio quality equal to or greater than a threshold based on downlink signals received from 3 RRUs 710/720/730 [S740, S745]. In an embodiment shown in FIG. 7, all of an RRU 1 710, an RRU 2 720 and an RRU 3 730 are measured as having a connection state and radio quality equal to or greater than a threshold.

Subsequently, the terminal 100 transmits a random access preamble to all of the 3 RRUs 710/720/730 [S750]. The terminal 100 can transmit an access information request message to the RRUs 710/720/730 to make a request for designation of an RRU to perform a random access together with the random access preamble.

Having received the random access preamble, each of the 3 RRUs 710/720/730 delivers the random access preamble and the access information request message to a BBU connected with the RRU. Subsequently, having received the random access preamble and the access information request message, the BBUs select a preferred BBU most appropriate for supporting a random access of the terminal 100 from a virtual BBU pool 350. In the present embodiment, a BBU 2 connected with the RRU 2 720 is selected as the preferred BBU.

The BBU 2 corresponding to the preferred BBU transmits an access information response message to the terminal 100 via the RRU 2 720 connected with the BBU 2 [S755]. The access information response message indicates the terminal 100 to perform a random access via the RRU 2 720 corresponding to the preferred RRU. In the present embodiment, since the response message is directly delivered to the terminal from the preferred RRU, identification information of the preferred RRU can be omitted from the response message.

Subsequently, the terminal 100 performs a random access process via the RRU 2 720 indicated by the received access information response message [S760, S765, 5770, S775].

FIG. 8 is a flowchart for explaining a method of performing random access according to a further different embodiment of the present invention. Referring to FIG. 8, a preferred BBU is selected by an access gateway 250 connecting 3 RRUs 810/820/830 with a virtual BBU pool 350.

In particular, each of the 3 RRUs 810/820/830 transmits a random access preamble and an access information request message to the access gateway 250 [S850]. If the information is received from the RRUs, the access gateway 250 selects a preferred BBU appropriate for supporting the terminal 100 in consideration of a load status and an available resource status of BBUs included in the virtual BBU pool 350.

Subsequently, the access gateway 250 transmits an access information response message to the terminal 100 via a preferred RRU connected with the preferred BBU [S855]. Having received the access information response message, the terminal 100 performs a random access process on the preferred BBU via the preferred RRU [S860, S865, S870, S875].

4. Device Configuration

FIG. 9 is a block diagram for a configuration of a terminal 100, an RRU 200 and a BBU 300 according to one embodiment of the present invention. Although FIG. 9 shows 1:1 communication environment between the terminal 100 and the RRU 200, communication environment can also be constructed between a plurality of terminals and the RRU.

Referring to FIG. 9, the terminal 100 can include an RF (radio frequency) unit 110, a processor 120 and a memory 130. A legacy base station 150 is configured to include a transmitting unit 212, a receiving unit 214, a processor 310 and a memory 320. On the contrary, in cloud RAN environment according to one embodiment of the present invention, the components included in the legacy base station 150 are implemented in a manner of being separated into an RRU 200 and a BBU 300.

Hence, the RRU 200 simply playing a role of an antenna includes a transmitting unit 212 and a receiving unit 214 only. Overall communication procedures such as signal processing, layer processing and the like are controlled by a processor 310 and a memory 320 included in the BBU 300. And, various connection relationships such as 1:1, 1:N, M:1,and M:N (where M and N are natural number) can be formed between the RRU 200 and the BBU 300.

The RF unit 110 included in the terminal 100 can include a transmitting unit 112 and a receiving unit 114. The transmitting unit 112 and the receiving unit 114 are configured to transceive a signal with the RRU 200. A processor 120 is functionally connected with the transmitting unit 112 and the receiving unit 114 and can be configured to control the transmitting unit 112 and the receiving unit 114 to transceive a signal with a different device. And, the processor 120 performs various processing on a signal to be transmitted and transmits the signal to the transmitting unit 112. The receiving unit 114 can perform processing on the received signal.

If necessary, the processor 120 can store information included in an exchanged message in a memory 130. With this structure, the terminal 100 can perform the aforementioned various embodiments of the present invention.

The transmitting unit 212 and the receiving unit 214 included in the RRU 200 are configured to transceive a signal with the terminal 100. The processor 310 of the BBU 300 connected with the RRU 200 is functionally connected with the transmitting unit 212 and the receiving unit 214 and can be configured to control the transmitting unit 212 and the receiving unit 214 to transceive a signal with different devices. And, the processor 310 performs various processing on a signal to be transmitted and transmits the signal to the transmitting unit 212. The receiving unit 214 can perform processing on the received signal. If necessary, the processor 310 can store information included in an exchanged message in a memory 320. With this structure, the RRU 200 and the BBU 300 can perform the aforementioned various embodiments of the present invention.

The processor 120/310 of the terminal 100 and the BBU 300 indicates (e.g., controls/adjusts/manages etc.) operations of the terminal 100, the RRU 200 and the BBU 300. Each of the processors 120/310 can be connected with the memory 130/320 configured to store program codes and data. The memory 130/320 stores an operating system, an application and general files in a manner of being connected with the processor 120/310.

The processors 120/310 according to the present invention can also be called a controller, a microcontroller, a microprocessor, a microcomputer, etc. The processors 120 and 220 may be embodied in the form of hardware, firmware, software, or a combination thereof When an embodiment of the present invention is embodied using hardware, the processor 120/310 may include application specific integrated circuits (ASICs), digital signal processors (DSPs), digital signal processing devices (DSPDs), programmable logic devices (PLDs), field programmable gate arrays (FPGAs), or the like which is configured to embody the present invention.

The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing a random access, which is performed by a terminal in C-RAN (cloud radio access network) environment in which an RRU (remote radio unit) and a BBU (baseband unit) are separated from each other, the method comprising:

selecting RRUs among a plurality of RRUs based on downlink signals received from the plurality of the RRUs, wherein a connection state of each of the selected RRUs with the terminal is equal to or greater than a threshold;

transmitting an RRU list, containing information on the selected RRUs and a first random access preamble, to a virtual BBU pool including a plurality of BBUs, the RRU list transmitted through a first RRU of which the connection state with the terminal is best among the selected RRUs;

receiving a response message from a BBU, which is selected from among one or more of the plurality of BBUs included in the virtual BBU pool, and which is connected with a RRU included in the RRU list, the response message received based on an available resource status and/or a load status of each of the one or more of the plurality of BBUs, wherein the response message indicates a second RRU connected with the BBU, and wherein the response message is received from the second RRU; and performing a random access process with the second RRU and the BBU by transmitting a second random access preamble to the BBU through the second RRU.

2. The method of claim 1, wherein the BBU is selected by a BBU connected with the first RRU which has received the RRU list and the first random access preamble.

3. The method of claim 1, wherein the RRU list is transmitted through the first RRU of which the connection state is best on a channel different from a channel for transmitting the first random access preamble.

4. The method of claim 1, wherein the plurality of the RRUs are connected with the virtual BBU pool via an access gateway.

5. The method of claim 1, wherein the transmitting comprises transmitting the RRU list and the first random access preamble through all of the selected RRUs in addition to the first RRU of which the connection state is best.

6. The method of claim 5, wherein the response message is received from the second RRU connected with the BBU.

7. A terminal performing a random access in C-RAN (cloud radio access network) environment in which an RRU (remote radio unit) and a BBU (baseband unit) are separated from each other, the terminal comprising:

a transmitting unit;
a receiving unit; and
a processor configured to:
  select RRUs among a plurality of RRUs based on downlink signals received from the plurality of the RRUs,
  wherein a connection state of each of the selected RRUs with the terminal is equal to or greater than a threshold;
  transmit an RRU list containing information on the selected RRUs and a first random access preamble to a virtual BBU pool including a plurality of BBUs, the RRU list transmitted through a first RRU of which the connection state with the terminal is best among the selected RRUs;
  receive a response message from a BBU, which is selected from among one or more of the plurality of BBUs included in the virtual BBU pool, and which is connected with a RRU included in the RRU list, the response message received based on an available resource status and/or a load status of each of the one or more of the plurality of BBUs,
  wherein the response message indicates a second RRU connected with the BBU, and
  wherein the response message is received from the second RRU; and
  perform a random access process with the second RRU and the BBU by transmitting a second random access preamble to the BBU through the second RRU.

8. The terminal of claim 7, wherein the preferred BBU is selected by a BBU connected with the first RRU which has received the RRU list and the first random access preamble.

9. The terminal of claim 7, wherein the RRU list is transmitted through the first RRU of which the connection state is best on a channel different from a channel for transmitting the first random access preamble.

10. The terminal of claim 7, wherein the plurality of the RRUs are connected with the virtual BBU pool via an access gateway.

11. The terminal of claim 7, wherein the processor is configured to transmit the first RRU list and the random access preamble through all of the selected RRUs in addition to the first RRU of which the connection state is best.

12. The terminal of claim 11, wherein the response message is received from the second RRU connected with the BBU.

* * * * *